Patented Feb. 6, 1934

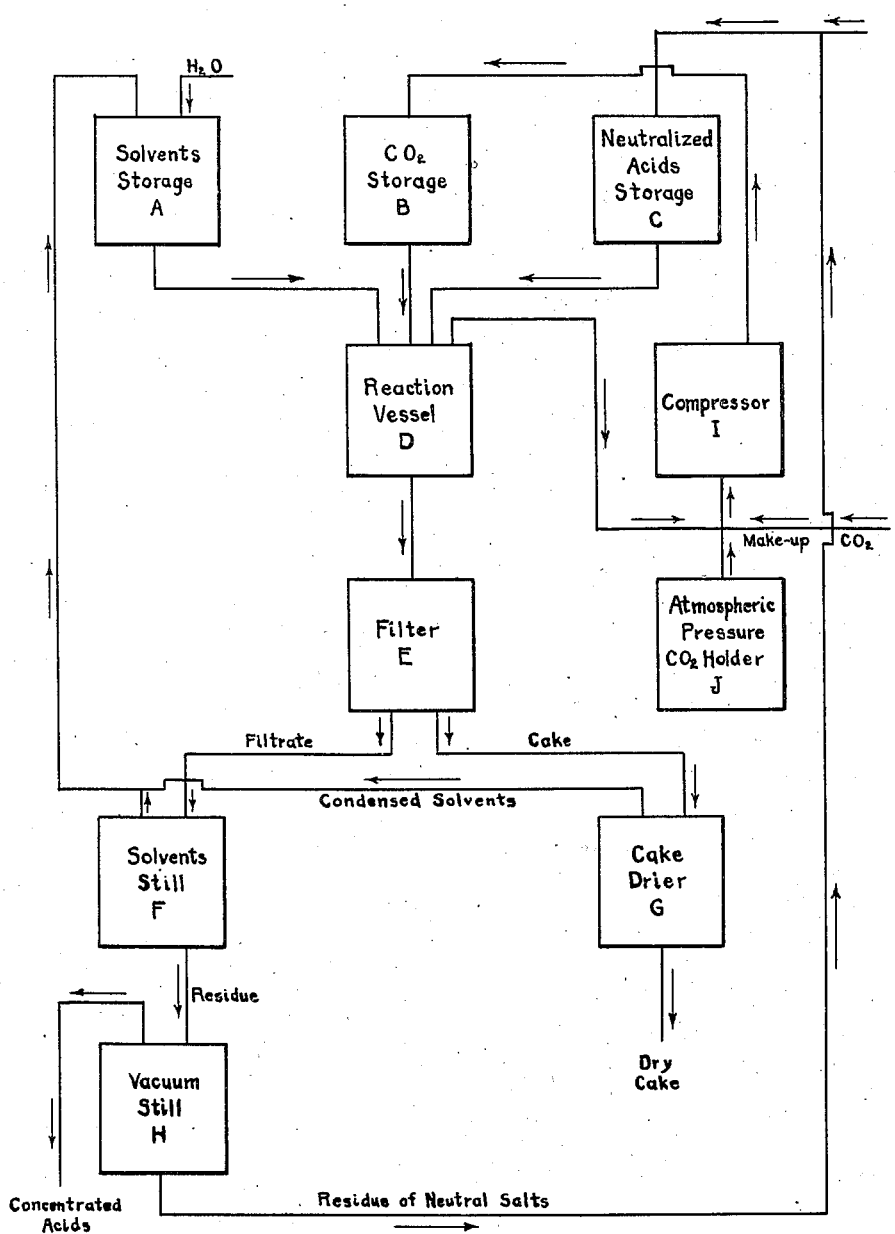

1,946,419

UNITED STATES PATENT OFFICE 1,946,419

PROCESS FOR RECOVERY OF ORGANIC ACIDS

John C. Woodruff and Grover Bloomfield, Terre Haute, Ind., and Ignace J. Krchma, Baltimore, Md., assignors to Commercial Solvents Corporation, Terre Haute, Ind., a corporation of Maryland Application April 27, 1931. Serial No. 533,018

20 Claims. (Cl. 260—118)

Our invention relates to a process for obtaining organic acids from their corresponding salts. More particularly, our invention relates to the process of releasing monobasic organic acids from their corresponding alkali or alkaline earth salts by the aid of carbon dioxide.

In the past it has been the practice in obtaining organic acids from their corresponding salts to treat the latter with non-volatile mineral acids such as sulphuric acid. This method, however, has certain disadvantages in a number of cases which are largely overcome by our new process. In the recovery of acetic acid from its salts, for example, considerable difficulty is experienced in obtaining good yields of acetic acid even when distilling under reduced pressure with concentrated sulphuric acid over extended periods of time. This method of obtaining organic acids possesses other very marked disadvantages in certain special cases as, for instance, in the recovery of acids produced by the fermentation of cellulosic materials, as for example in the Langwell fermentation process (cf. U. S. Patents Nos. 1,443,881, 1,602,306, 1,639,571). In the latter process the formation of acetic, propionic and butyric acids in good yield requires maintaining the mash practically neutral, and this is accomplished by the addition during the fermentation of alkaline materials such as caustic soda, soda ash, sodium or potassium carbonate or bicarbonates. The recovery of the organic acids from the fermentation beer by the usual method of evaporating to dryness, adding sulphuric acid and distilling, involves the loss of the alkali in the form, for instance, of sodium sulphate. Further difficulties result from the fact that oftentimes considerable quantities of organic matter are present with the recovered salts. The same principle applies also to other fermentation processes and even in the production of acetic acid by the destructive distillation of hard woods it is customary also to recover the acid in the form of its alkali or alkaline earth metal salts. The economic aspect of these processes would be greatly improved and their successful commercial utilization furthered if the alkaline material used for neutralization could, instead of being lost in the form of a useless salt, be recovered in its original form and reused, and if a cheaper material could be substituted for the usual acid, e. g., sulphuric, employed for liberating the organic acids. In fact, the development of such improvements might make a process economically workable which with the ordinary acid recovery methods would not be so. Our invention discloses a process based on these improvements.

We have discovered that organic acids may be liberated from their salts by novel means that comprise subjecting said salts to the action of carbon dioxide gas at elevated pressures in the presence of a partially non-aqueous reaction medium. As will be seen from the disclosure which follows, the carbon dioxide serves as an efficient and at the same time as a very cheap means of liberating such acids. By suitable regulation of the operating conditions excellent yields at very low cost are possible by our new method.

The operation of our process may best be understood by applying it to the recovery of a particular acid, as for example, acetic acid from one of its corresponding salts such as sodium acetate. When a solution of sodium acetate is treated with carbonic acid, sodium bicarbonate and acetic acid are formed. The reaction in aqueous solution of sodium acetate and carbonic acid, however, as represented by the equation:

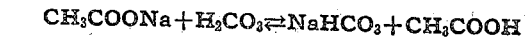

or in another form by:

is a familiar example of a reversible reaction, and under ordinary circumstances the reaction takes place to only so small an extent that it cannot be used in practice for liberating acetic acid from its salts. Increasing the pressure of the carbon dioxide in the reaction represented above, or changing the temperature does not increase the concentration of the acetic acid sufficiently for practical recovery.

We have now found that when partially non-aqueous reaction media are used, considerably higher conversions of the reactants to acetic acid can be obtained than when water is employed as the reaction medium. By the aid of reaction media hereinafter disclosed and of carbon dioxide particularly at elevated pressures, practical yields of acids may readily be obtained. We attribute these increased yields to the fact that at elevated pressures much higher concentrations of carbon dioxide—and consequently of carbonic acid—are obtainable in the reaction media, and also to the fact that the sodium bicarbonate formed during the release of the acetic or other acid is much less soluble in the reaction media employed by us than in pure water.

Aqueous solutions of salts such as calcium, barium and copper acetate have been found to give precipitates of the corresponding metallic carbonates on being subjected to the action of carbon dioxide under a pressure of approximately 50 atmospheres. The reaction, however, is quite slow and rather irregular, from three to seven days being required for appreciable amounts of the carbonate to be formed. With partially non-aqueous media, lower temperatures, and agitation, the rate of reaction is greatly accelerated and much better results are obtained. Likewise, it has been found that by employing partially non-aqueous media and agitating salts such as sodium acetate for a number of hours, appreciable amounts of bicarbonate are deposited and a corresponding amount of acetic acid liberated. But simply by increasing the carbon dioxide pressure from atmospheric to about 800 lbs. per square inch pressure increasingly good yields of acetic acid are liberated from sodium acetate by the carbon dioxide in as short a period of time as twenty to thirty minutes, whereas, much longer periods of time and considerably lower yields are obtained when operating at atmospheric pressure.

The data shown in the table below illustrate the yields of acetic acid which may be obtained by treating sodium acetate with carbon dioxide under different conditions. In obtaining these results a liter of the reaction medium was placed in a reaction vessel capable of withstanding pressure and provided with means for agitation. To the reaction medium was then added 150–250 grams of powdered fused sodium acetate, the amount of the latter employed being usually about 15 to 30% in excess of that which would be reacted by the carbon dioxide. After charging, the vessel was closed, the agitator started, and carbon dioxide introduced from a suitable source until the desired pressure was obtained. After a given period, the agitation was stopped, the pressure rapidly decreased to atmospheric, and the contents of the reaction vessel discharged directly into a vacuum filter or laboratory centrifugal and the solids separated. The operations were carried out at approximately room temperature.

Table

| No. | Medium—Composition by volume | Pressure lbs. per sq. in. | Reaction time hours | Grams HAc in 100 c.c. of liquid product |
|---|---|---|---|---|
| 1 | 27% BuOH / 60% EtOH (95%) / 13% H₂O | 800 | 2 | 15.0 |
| 2 | 27% BuOH / 60% EtOH (95%) / 13% H₂O | 560 | 2 | 12.5 |
| 3 | 27% BuOH / 60% EtOH (95%) / 13% H₂O | 300 | 2 | 10.3 |
| 4 | 27% BuOH / 60% EtOH (95%) / 13% H₂O | 800 | ⅓ | 14.0 |
| 5 | 30% BuOH / 60% MeOH / 10% H₂O | 800 | 2 | 12.8 |
| 6 | 47.5% BuOH / 47.5% MeOH / 5.0% H₂O | 14.7 | 16 | 3.8 |
| 7 | 46% EtOH / 46% EtAc / 8% H₂O | 880 | ⅓ | 15.5 |
| 8 | 23% MeOH / 70% MeAc / 7% H₂O | 820 | ⅓ | 14.0 |
| 9 | 34.0% EtOH / 31.5% EtAc / 27.5% gasolene (b. p. 60–69° C.) / 7.0% H₂O | 825 | ⅓ | 14.5 |
| 10 | 94% acetone / 6% H₂O | 800 | ⅓ | 14.0 |
| 11 | 47.5% EtOH (95%) / 27.5% benzol / 20.0% gasolene (b. p. 60–69° C.) / 5.0% H₂O | 800 | ⅓ | 14.0 |
| 12 | 15.0% acetone / 40.0% EtOH (95%) / 25.0% benzol / 15.0% gasolene (b. p. 60–69° C.) / 5.0% H₂O | 800 | ⅓ | 14.0 |

Example 6 shows that even when the $CO_2$ is used at atmospheric pressure, a substantial concentration of acetic acid is obtained. Examples 1, 2, and 3 show that the yield of acid is increased as the pressure is raised. Comparison of Examples 1 and 4 indicates that a very short time of reaction suffices to give a practically optimal yield of acid, the result after ⅓ hour being substantially the same as after 2 hours.

The concentration of the sodium acetate or other salt being treated, which may be employed is determined by its solubility in the particular reaction medium used. The solubility in practice with the favored solvents was always found to be less than in water, but still noticeable, say of the order 0.1 to 5%.

In general it is seen that with a $CO_2$ pressure of 800 lbs. per square inch a product containing about 15 grams of acetic acid per 100 c. c. can be obtained with various solvent combinations.

Of the different variables which affect the results obtained by this method the selection of the proper reaction medium is one of the most important and difficult of the problems involved. Many experiments have been carried out for the purpose of studying the effects of changes in the reaction medium. As the result of this work it appears that the reaction is not specific with a certain material but is general with a large variety of solvents. Moreover, mixtures of solvents may be employed. In some instances where a solvent fails by itself, its mixture with another solvent works reasonably well. In addition to the solvent mixtures cited above some other mixtures which also give satisfactory results are as follows: butanol—ethanol—benzol—water; butanol—ethanol—gasolene—water; ethanol—benzol—water; commercial ethyl acetate—water; ethanol—ethyl acetate—gasolene—water; acetone—water; methanol—water; acetone—methanol—water; ethylene glycol—diacetone alcohol—water; cresol—ethylene glycol—water.

In connection with the selection of a proper reaction medium there are a number of other factors besides that of the concentration of the acetic acid obtained which must be taken into consideration. One requirement is that the solution of acetic acid and medium be readily resolvable into acetic acid in usable form and the original medium. For this purpose a medium boiling at a temperature either considerably lower or else higher than the acid being removed is desirable. However, the medium employed should not have too high a boiling point since in that case complete recovery of the medium from the bicarbonate cake left after filtration would be too difficult. This is due to the fact that the solvent as a rule must be recovered by vaporization, and this is done by heating the wet sodium bicarbonate. In this connection it is well to note that butanol is a component of a number of the solvent mixtures shown above. Since butanol boils at nearly the same temperature as acetic acid the separation of the two by distillation is impossible. However, since a mixture of the two can be directly esterified to butyl acetate their separation is not required when this product is to be manufactured and in this case there is no objection to using butanol in the original reaction medium.

While, as previously stated, water must be present in the process as a reactant, it is desirable to use only a relatively low concentration. In the first place, media containing too large proportions of water give unsatisfactory conversions to acetic acid, and in the second place such media will yield only dilute aqueous acid difficult to concentrate by simple distillation. Still another objection to the use of an excess of water is that it makes the filtration of the bicarbonate cake more difficult in some cases. We have found that, in general, satisfactory results may be obtained if the medium contains from 3% to 40% of water, but somewhat better results are obtained if the water content is restricted to between 5% and 15% of the total volume of the medium. This water may be added to the reaction medium in small portions, if desired, as the reaction proceeds. It is understood also that in regulating the amount of water used in the reaction medium it is necessary to take into consideration that introduced in the form of water of crystallization, or otherwise with the salt to be converted, etc.

Another factor of importance is the filtrability of the reaction mixture after release of the carbon dioxide pressure. It has been found that certain media which are otherwise satisfactory yield more or less heavy gels with the solids present and cannot be easily filtered, while certain other media filter very easily. Thus, media composed substantially of only methanol, ethanol, butanol, or cresol, yield gels. However, adding to such media substantial proportions of materials such as benzol, gasolene, ethyl acetate, methyl acetate, etc., produces mixtures entirely free from this defect. We have in general observed that the gel forming media are better solvents for the sodium acetate than the media which correct this fault. Runs 1 to 6 inclusive, in the preceding table are examples of poor filtering combinations, while 7 to 9 are examples of good filtering media. It is, of course, possible to obtain intermediate mixtures by using greater or lesser proportions of the non-solvent. Careful consideration must be given to this point since it is desirable to use as good a filtering medium as consistent with the other factors involved in its choice. A rapid and clean filtration is obviously desirable in any large scale process. In addition, consideration of design of equipment may make it preferable to filter under atmospheric pressure. This involves releasing the $CO_2$ pressure from the system, which obviously tends, by decreasing the concentration of this reactant, to cause a tendency to the reversal of the original reaction. Separation of the solid sodium bicarbonate from the acetic acid by filtration of course makes this reversal impossible. In practice it has been found possible to obtain this separation at ordinary pressure rapidly enough with easily filtrable media to confine the reverse reaction to engligible proportions. With poor filtration, on the other hand, the yield of acetic acid may be noticeably reduced by the reverse reaction.

We have found that best results are obtained when the reaction medium is a homogeneous phase. Hence in selecting a medium it is desirable to consider the mutual miscibility of the components under the conditions of operation. It has been observed that the components which it has been found advantageous to add to improve the filtrability of the reaction product and which are poor solvents for sodium acetate, are sometimes immiscible with the other components in the presence of the small amounts of water required as reactant. Thus, petroleum hydrocarbons and ethyl alcohol containing small amounts of water cannot be mixed. Benzol and methanol also fail to yield a homogeneous solution in the presence of water. In such cases in order to achieve the desired miscibility of the components, a third liquid such as butanol or acetone may be used in substantial amounts to act as a couple. Ethyl and methyl acetates are effective in this role, serving both as couples and as agents against poor filtration. Altogether while the field for choice of solvents is wide, it is best to take care to ensure against incompatibility. It should be pointed out also that in selecting a reaction medium of a homogeneous character it is necessary only that the mixture chosen be of this character at the end of the reaction. It is possible to select materials which will be non-compatible at the beginning of the operation, but which will be satisfactorily homogeneous by the time the reaction is finished. The acetic or other acid released by the reaction acts as a couple to produce homogeneity in the case of media which are not campatible at the beginning of the reaction.

In the above we have restricted our discussion to the conversion of the one salt, sodium acetate, to its acid. This was done solely to simplify the description.

Actually the process may be successfully applied to a large variety of salts. Generally one may use the alkali and alkaline earth metal salts of:

(a) Aliphatic monobasic acids. Specially favorable results are obtained with homologous series from the acetate to the stearates and higher compounds.

(b) Aromatic acids. Substantial yields, for instance, of benzoic and salicylic acids are obtained from their sodium salts.

The alkali and alkaline earth metal salts will be termed herein, and in the appended claims, salts of alkali-forming metals.

The following table sets forth the acid concentrations obtained with a number of salts and illustrates the wide range of applicability of our process.

Table

| Medium—composition by volume | Salt | Pressure lbs. per sq. in. | Reaction time: hours | Grams of acid in 100 c. c. liquid product |
|---|---|---|---|---|
| *Percent*<br>27 BuOH<br>60 EtOH<br>13 H₂O | Sodium propionate | 800 | ½ | 14.0 |

*Table*—Continued

| Medium—composition by volume | Salt | Pressure lbs. per sq. in. | Reaction time: hours | Grams of acid in 100 c. c. liquid product |
|---|---|---|---|---|
| Percent 27 BuOH, 60 EtOH, 13 H$_2$O | Sodium butyrate | 800 | ½ | 23.0 |
| 27 BuOH, 60 EtOH, 13 H$_2$O | 4 parts NaAc, 1 part NaBu | 800 | ½ | 14.8 |
| 75 EtOH, 20 benzol, 5 H$_2$O | Cocoa soap | 360 | ½ | 19.8 (as stearic) |
| 60 EtOH, 13 H$_2$O, 27 BuOH | Ca(Ac)$_2$.H$_2$O | 800 | 2½ | 6.5 |
| 93 EtOH, 7 H$_2$O | Sodium benzoate | 600 | ½ | 14.5 |
| 93 EtOH, 7 H$_2$O | Sodium salicylate | 600 | ½ | 3.0 |

The general method of operation in all cases and the considerations as to carbon dioxide pressure, homogeneity of medium, filtrability of product, etc., are similar to those applying to sodium acetate, although the details may differ. In general, when alkaline earth salts are to be converted the reaction medium may contain larger proportions of water than are desirable with the alkali metal salts, possibly because the bicarbonates formed in this case are less soluble in aqueous media than are the alkali bicarbonates.

We have devoted much time to a consideration of the theory upon which the success of our process may be based, and the following discussion embodies what we believe to be the important points.

The factors we consider decisive in the conversion of a salt by treatment with carbon dioxide are the solubilities of all the reactants and products and the strengths in the medium of the carbonic acid and the acid formed in the reaction. As a measure of the strengths of the acids we consider their degrees of dissociation in the medium. A high solubility of the salt to be converted, high carbon dioxide pressure with a consequent increased concentration of carbonic acid, small solubility of the bicarbonate or carbonate salt formed, and weakness of the acid released are factors favoring our process.

The results obtained in practice will depend upon the net effect of all these factors and the latter need not all be exceedingly favorable to obtain good conversions. Thus it may be possible to obtain a substantial conversion of a salt that is but little soluble in the medium if the acid formed is very weak and the CO$_2$ is applied under considerable pressure. On the other hand, a conversion of the same order may be obtained if a salt has a considerable solubility, even if the acid formed is much stronger than in the above case and the CO$_2$ is applied at a lower pressure.

The factors are all affected by temperature.

We attribute the high conversions of salts by CO$_2$ obtained by us with partially non-aqueous media to the favorable net effect the latter have on the factors discussed.

While we consider the above explanation to be right, we do not wish our invention in any way to depend on the correctness of our theory.

A flow diagram showing one method by which our process may be satisfactorily operated is shown in Fig. I. It is understood, however, that this is cited merely as an example and that the process described may be suitably modified in a number of ways without departing from the concept of our invention. In the flow sheet, the vessels A, B, and C are respectively storage vessels for the reaction medium, the carbon dioxide, and the sodium acetate or other salt to be treated. With the reaction vessel D at atmospheric pressure, calculated quantities of sodium acetate and reaction medium are introduced into the vessel and carbon dioxide then run in from B until the desired pressure is attained. The contents of the reaction vessel are then agitated by suitable means for a given period of time. At the end of the time allowed for the reaction, the agitation is stopped and the carbon dioxide in the vessel is quickly expanded out of the vessel until atmospheric pressure is attained. Instead of discharging the carbon dioxide to the air it may preferably be expanded into the atmospheric pressure holder J from which it is recompressed back into the storage vessel B by means of the compressor I. The mixture remaining in D is meanwhile quickly run into a suitable separating apparatus such as a centrifuge or filter as indicated by E, where it is separated into cake and filtrate. A Vallez type filter has been found to be particularly adapted for use at this step in the process with certain media and materials. If desired, filtration may be under the pressure at which the reaction was carried out, and the pressure on the system only reduced after this step, but preferably, the pressure in the reaction vessel is partially released, leaving a portion of the pressure in the vessel to complete the discharging and filtration. A practical course of procedure is to reduce the pressure in the reaction vessel to about 75–100 lbs. per square inch. The cake, which consists substantially of sodium bicarbonate and some residual unconverted salts, moisture, organic tarry materials, etc., after suitable washing with reaction mixture, is sent to the cake drier G where the solvents are recovered by heating and returned to the storage vessel A.

The sodium bicarbonate in the cake breaks down partly or altogether in this heating process, and the dry residue therefore consists mainly of sodium carbonate with small amounts of sodium acetate remaining as unconverted material. This recovered product may be used for any purpose where sodium bicarbonate is required. If the small amount of sodium acetate present proves objectionable it may be removed by dissolving the dry cake in water and reprecipitating the bicarbonate with carbon dioxide at atmospheric pressure and room temperature. Sodium bicarbonate is quite insoluble in the presence of sodium acetate and may therefore be filtered off and washed free of sodium acetate. The concentrated sodium acetate liquor so obtained is then further concentrated, if necessary, and the salt either recovered in dry form or returned to the process in aqueous solution.

The filtrate from the centrifuge or filter E consisting of a solution of acetic acid and unconverted sodium acetate in the reaction medium is sent to the still F and the medium and acid recovered separately. At this point the procedure varies according to whether a high boiling or a low boiling medium is employed. In the case of a high boiling medium the acid is distilled off in F and the residue consisting of a solution of sodium acetate in the medium is returned to A for reuse. In the case of a low boiling medium, the medium is distilled off in F and a solution of the acid and unconverted sodium acetate remains as a residue. This is sent to a scraper agitated vacuum still H and resolved into concentrated acetic acid and dry sodium acetate. The sodium acetate is then returned to the storage vessel C.

It may be seen by the diagram that nothing leaves the process except acetic acid and sodium bicarbonate and carbonate, and nothing enters except sodium acetate, carbon dioxide and the water needed to give carbonic acid with the carbon dioxide. Thus the material costs including those for the cheap $CO_2$ taking part in the reaction are practically negligible, and the expense of carrying out the process is restricted to mere operation, overhead costs and replacements of such solvents as are lost in recycling. Those parts of the system in which solvents move may be readily arranged to be entirely closed so as to reduce solvent losses to a minimum.

The operating procedure outlined above may be modified appreciably by changing the character of the reaction medium. Decidedly improved results may, for example, be obtained by using a highly volatile solvent or mixture of solvents. If dimethyl ether or mixtures of this compound with gaseous hydrocarbons of the methane or ethylene series be substituted for the higher boiling solvents of the character hereinabove enumerated, a decided advantage is gained due to the elimination of two steps of the operation. The use of such a reaction medium obviates first, the necessity of fractionating the reaction product in order to separate and recover the acid and the reaction medium, and second, the step comprising the recovery of the reaction medium from the bicarbonate cake by a special heating.

When using a highly volatile reaction medium the reaction is carried out just as previously outlined. Under the elevated pressure at which the reaction is preferably conducted the dimethyl ether and hydrocrabon, or other volatile reaction medium, are liquid. When the reaction is completed the pressure is released to say about 100 lbs. per sq. in. in a closed system. At this pressure most of the reaction medium is still in liquid form and under this condition the bicarbonate can be filtered out. After completion of the filtration the pressure is released to approximately atmospheric still in a closed system, and this allows all of the reaction medium to pass into the gaseous state, leaving both the cake and the acid relatively free from the volatile reaction medium. The make-up carbon dioxide which is added to the system for the next operation is passed through the cake and the acid in order to ensure complete recovery of the gases comprising the reaction medium. The reaction medium and the carbon dioxide are then recompressed and the whole reused.

In the examples cited above we have described the production of acetic acid from sodium acetate. The same general operation, however, may be carried out with any salts covered by the classification given above.

Mixtures of salts are also found to work satisfactorily. In the Langwell process for the production of acetic, butyric, and propionic acids by the fermentation of cellulosic materials, mixtures of the sodium, calcium, etc. salts of these acids are obtained, depending upon the neutralizing medium used. Our process is a particularly satisfactory method of recovering these acids from their corresponding salts. The recovered carbonate, bicarbonate, containing small amounts of acetates and butyrates may then be immediately reused in the Langwell process as neutralizing agents without the necessity of further treatment.

Mixtures of salts produced in the Langwell fermentation process may be employed in the form and concentration obtainable when a solution of such salts is evaporated. By using 500 grams of a product of approximately the composition indicated below, to 1000 c. c. of acetone, excellent results have been obtained.

|  | Per cent |
|---|---|
| Total volatile acids | 30.94 |
| Insoluble solids | 3.10 |
| Total solids | 56.53 |
| Water | 43.47 |

The operation may be carried out at substantially atmospheric pressures, but greatly improved results are obtained by using elevated pressures for the purpose of increasing the concentration of carbon dioxide gas and consequently that of the carbonic acid. The pressure employed in any particular operation depends largely upon the method of carrying out the operation, it being possible to employ pressures up to several thousand pounds per square inch if the temperature is maintained above 31° C., the critical temperature for carbon dioxide. It is not practical, however, as a rule, to use pressures higher than 800 to 900 lbs. per square inch due to difficulties involved in quickly expanding down to atmospheric pressure, difficulty in regulating temperatures due to large heats of solution of the $CO_2$, increase in volume of reaction medium due to absorbed carbon dioxide, expense of handling large volumes of gas at high pressures, etc.

Now having described our process, what we claim is:

1. In a process for obtaining a carboxylic organic acid from its corresponding salt of an alkali-forming metal, the step which comprises subjecting said salt to the action of carbon dioxide gas in the presence of a homogeneous aqueous organic liquid medium in which said salt is at least partially soluble.

2. In a process for obtaining a carboxylic organic acid from its corresponding salt of an alkali-forming metal, the step which comprises subjecting said salt to the action of carbon dioxide gas in the presence of a homogeneous aqueous organic liquid medium in which said salt is at least partially soluble and in which the resulting metal bicarbonate is substantially insoluble.

3. In a process for obtaining a carboxylic organic acid from its corresponding salt of an alkali-forming metal, the step which comprises subjecting said salt to the action of carbon dioxide gas under superatmospheric pressure in the presence of a homogeneous aqueous organic liquid medium in which said salt is at least partially soluble.

4. In a process for obtaining a carboxylic organic acid from its corresponding salt of an alkali-forming metal, the step which comprises subjecting said salt to the action of carbon dioxide gas under superatmospheric pressure in the presence of a homogeneous aqueous organic liquid medium in which said salt is at least partially soluble and in which the resulting metal bicarbonate is substantially insoluble.

5. In a process for obtaining a carboxylic organic acid from its corresponding salt of an alkali-forming metal, the step which comprises subjecting said salt to the action of carbon dioxide gas under superatmospheric pressure in the presence of a homogeneous aqueous organic liquid medium containing 3-20% of water and in which medium said salt is at least partially soluble.

6. In a process for obtaining a carboxylic organic acid from its corresponding salt of an alkali-forming metal, the step which comprises subjecting said salt to the action of carbon dioxide gas under superatmospheric pressure in the presence of a homogeneous aqueous organic liquid medium, containing 3-20% of water, in which medium said salt is at least partially soluble and in which medium the resulting metal bicarbonate is substantially insoluble.

7. In a process for obtaining a monocarboxylic aliphatic acid from its corresponding salt of an alkali-forming metal, the step which comprises subjecting said salt to the action of carbon dioxide gas under superatmospheric pressure in the presence of a homogeneous aqueous organic liquid medium in which said salt is at least partially soluble.

8. In a process for obtaining a monocarboxylic aliphatic acid from its corresponding salt of an alkali-forming metal, the step which comprises subjecting said salt to the action of carbon dioxide gas under superatmospheric pressure in the presence of a homogeneous aqueous organic liquid medium in which said salt is at least partially soluble and in which the resulting metal bicarbonate is substantially insoluble.

9. In a process for obtaining a monocarboxylic aliphatic acid from its corresponding salt of an alkali-forming metal, the step which comprises subjecting said salt to the action of carbon dioxide gas under superatmospheric pressure in the presence of a homogeneous aqueous organic liquid medium, containing 3-20% of water, in which medium said salt is at least partially soluble.

10. In a process for obtaining a monocarboxylic aliphatic acid from its corresponding salt of an alkali-forming metal, the step which comprises subjecting said salt to the action of carbon dioxide gas under superatmospheric pressure in the presence of a homogeneous aqueous organic liquid medium, containing 3-20% of water, in which medium said salt is at least partially soluble and in which medium the resulting metal bicarbonate is substantially insoluble.

11. In a process for obtaining acetic acid from its corresponding salt of an alkali-forming metal, the step which comprises subjecting said salt to the action of carbon dioxide gas under superatmospheric pressure in the presence of a homogeneous aqueous organic liquid medium in which said salt is at least partially soluble.

12. In a process for obtaining acetic acid from its corresponding salt of an alkali-forming metal, the step which comprises subjecting said salt to the action of carbon dioxide gas under superatmospheric pressure in the presence of a homogeneous aqueous organic liquid medium in which said salt is at least partially soluble and in which the resulting metal bicarbonate is substantially insoluble.

13. In a process for obtaining acetic acid from its corresponding salt of an alkali-forming metal, the step which comprises subjecting said salt to the action of carbon dioxide gas under superatmospheric pressure in the presence of a homogeneous aqueous organic liquid medium containing 3-20% of water and in which medium said salt is at least partially soluble.

14. In a process for obtaining acetic acid from its corresponding salt of an alkali-forming metal, the step which comprises subjecting said salt to the action of carbon dioxide gas under superatmospheric pressure in the presence of a homogeneous aqueous organic liquid medium, containing 3-20% of water, in which medium said salt is at least partially soluble and in which medium the resulting metal bicarbonate is substantially insoluble.

15. In a process for obtaining a monocarboxylic aliphatic acid from its corresponding salt of an alkali-forming metal, the step which comprises subjecting said salt to the action of carbon dioxide gas under superatmospheric pressure in the presence of a medium comprising 97-80% acetone and 3-20% water.

16. In a process for obtaining acetic acid from its corresponding salt of an alkali-forming metal, the step which comprises subjecting said salt to the action of carbon dioxide gas under superatmospheric pressure in the presence of a medium comprising 97-80% acetone and 3-20% water.

17. In a process for obtaining a moncarboxylic aliphatic acid from its corresponding salt of an alkali-forming metal, the step which comprises subjecting said salt to the action of carbon dioxide gas under superatmospheric pressure in the presence of a medium comprising methyl acetate, methanol and water in which medium said salt is at least partially soluble.

18. In a process for obtaining acetic acid from its corresponding salt of an alkali-forming metal, the step which comprises subjecting said salt to the action of carbon dioxide gas under superatmospheric pressure in the presence of a medium comprising methyl acetate, methanol and water in which medium said salt is at least partially soluble.

19. In a process for obtaining a monocarboxylic aliphatic acid from its corresponding salt of an alkali-forming metal, the step which comprises subjecting said salt to the action of carbon dioxide gas under superatmospheric pressure in the presence of a medium consisting of about 72% methyl acetate, about 22% methanol, and about 6% water.

20. In a process for obtaining acetic acid from its corresponding salt of an alkali-forming metal, the step which comprises subjecting said salt to the action of carbon dioxide gas under superatmospheric pressure in the presence of a medium consisting of about 72% methyl acetate, about 22% methanol, and about 6% water.

JOHN C. WOODRUFF.
GROVER BLOOMFIELD.
IGNACE J. KRCHMA.